United States Patent [19]
Ohara

[11] Patent Number: 5,491,572
[45] Date of Patent: Feb. 13, 1996

[54] METHOD AND SYSTEM FOR DETECTING TROUBLE IN TWO-WAY SINGLE-FIBER OPTICAL TRANSMISSION

[75] Inventor: Yasuko Ohara, Kawasaki, Japan

[73] Assignee: Fujitsu Limited, Kanagawa, Japan

[21] Appl. No.: 202,948

[22] Filed: Feb. 28, 1994

[30]   Foreign Application Priority Data

Sep. 16, 1993   [JP]   Japan .................................. 5-253798

[51] Int. Cl.$^6$ ................................................ H04B 10/08
[52] U.S. Cl. .......................................... 359/110; 370/13
[58] Field of Search ..................... 359/110, 113, 359/114, 177; 370/13, 14, 16; 371/8.2, 11.2; 340/825.05, 825.15, 825.16

[56]          References Cited

U.S. PATENT DOCUMENTS

| | | | |
|---|---|---|---|
| 4,399,563 | 8/1983 | Greenberg | 359/113 |
| 4,825,113 | 4/1989 | Sato et al. | 359/110 |
| 4,899,043 | 2/1990 | Mochizuki et al. | 359/114 |
| 4,946,244 | 8/1990 | Schembri | 359/110 |
| 4,994,675 | 2/1991 | Levin et al. | 359/110 |
| 5,150,243 | 9/1992 | Suzuki | 359/110 |
| 5,153,874 | 10/1992 | Kohno | 370/16 |
| 5,218,465 | 6/1993 | Lebby et al. | 359/110 |
| 5,228,027 | 7/1993 | Yamaguchi | 340/825.05 |
| 5,267,068 | 11/1993 | Torihata | 359/110 |
| 5,285,198 | 2/1994 | Asahina | 340/825.15 |
| 5,291,326 | 3/1994 | Heidemann | 359/160 |

FOREIGN PATENT DOCUMENTS

| | | | |
|---|---|---|---|
| 0368282 | 5/1990 | European Pat. Off. | 359/110 |
| 4109683 | 9/1992 | Germany | 359/160 |
| 5122339 | 5/1993 | Japan | 340/825.16 |

*Primary Examiner*—Leo H. Boudreau
*Assistant Examiner*—Bhavesh Mehta

[57]            ABSTRACT

A method for detecting trouble occurring in a single-fiber two-way optical transmission system containing first and second optical terminal stations connected to each other through at least one two-way single optical fiber. A first abnormality in a first optical signal received at the first optical terminal station is detected. A notice that the first optical terminal station will stop transmission of optical signals, is transmitted from the first optical terminal station to the second optical terminal station after occurrence of the first abnormality is detected. Transmission of optical signals from the first optical terminal station is stopped after transmission of the notice. An abnormality in an optical signal next received at the first optical terminal station is detected after the stopping of the transmission of optical signals from the first optical terminal station.

28 Claims, 6 Drawing Sheets

METHOD AND SYSTEM FOR DETECTING TROUBLE IN TWO-WAY SINGLE-FIBER OPTICAL TRANSMISSION

BACKGROUND OF THE INVENTION

1. Field of the Invention

The present invention relates to a method and system for detecting trouble in a single-fiber two-way optical transmission. Recently, two-way optical transmission through a single optical fiber by using optical signals of the same or different wave lengths, is being developed in order to increase the amount of information transmitted through a single fiber. However, conventional methods for detecting trouble used in single-fiber one-way transmission, cannot be used in single-fiber two-way optical transmission.

2. Description of the Related Art

In the conventional single-fiber one-way transmission system, two-way transmission between two opposite optical terminal stations can be performed through at least two optical fibers in opposite directions. In such a system, the detection of trouble is carried out by monitoring at each optical terminal station the level of an optical signal transmitted through the optical fiber directed to the optical terminal station and received at the optical terminal station, and transmitting to the opposite optical terminal station an alarm signal for informing detection of trouble when an abnormality (failure) in the level of the optical signal is detected.

However, in the single-fiber two-way optical transmission systems, when trouble such as a break in the optical fiber occurs, an optical signal transmitted from an optical terminal station may be reflected at the point of the break, and then may be received by the optical terminal station which has transmitted the optical signal. Namely, in the single-fiber two-way optical transmission systems, trouble occurring in optical fibers may not be able to be detected by each optical terminal station by monitoring the level of the optical signal received at the optical terminal station.

SUMMARY OF THE INVENTION

An object of the present invention is to provide a method and system for detecting trouble in single-fiber two-way optical transmission, which is not affected by reflection at a break point of an optical fiber.

According to the first aspect of the present invention, there is provided a method for detecting trouble occurring in a single-fiber two-way optical transmission system containing first and second optical terminal stations connected to each other through at least one two-way single optical fiber. The method contains a first step of detecting a first abnormality in a first optical signal received at the first optical terminal station; a second step of transmitting from the first optical terminal station to the second optical terminal station a first notice that the first optical terminal station will stop transmission of second optical signals after a first abnormality is detected in the first step; a third step of stopping the transmission of second optical signals from the first optical terminal station, after the transmission of the first notice in the second step; and a fourth step of detecting a second abnormality in a third optical signal received at the first optical terminal station after the stopping of the transmission of the second optical signals.

In addition to the above construction of the first aspect of the present invention, the method may further contain a fifth step for transmitting from the first optical terminal station to the second optical terminal station a second notice that the first optical terminal station has restarted transmission of the second optical signals, after the detection of the second abnormality in the fourth step.

In addition to the above construction, the method may further contain a step of receiving by the second optical terminal station the first notice transmitted from the first optical terminal station; and a step of transmitting third optical signals from the second optical terminal station to the first optical terminal station after the reception of the first notice by the second optical terminal station until the second notice is received by the second optical terminal station.

In the above construction, in the third step, the stopping of the transmission may be performed a first predetermined time after the transmission of the first notice in the second step, where the first predetermined time is determined to be larger than a time needed for the second optical terminal station to receive the first notice, and to perform an operation in response to the reception of the first notice after the first notice is transmitted from the first optical terminal station in the second step.

In the construction of the first aspect of the present invention, the method may further contain a step of transmitting from the first optical terminal station to the second optical terminal station alarm information indicating the second detection of an abnormality detected in the first optical terminal station, after the detection of the second abnormality in the fourth step.

Operations similar to the operations performed in the above steps by one of the optical terminal stations in the first aspect of the present invention, may further be performed by the other optical terminal station as follows. In this case, the method may further contain a fifth step of detecting a third abnormality in a third optical signal received at the second optical terminal station; a sixth step of transmitting from the second optical terminal station to the first optical terminal station a third notice that the second optical terminal station will stop transmission of fourth optical signals, a second predetermined time after the third abnormality is detected in the fifth step, where the second predetermined time is determined to be larger than an elapsed time after the first abnormality is detected in the first step until the first optical terminal station detects the second abnormality in the fourth step; a seventh step of stopping the transmission of the fourth optical signals after the transmission of the third notice in the sixth step; and an eighth step of detecting a fourth abnormality in a fifth optical signal received at the second optical terminal station after the stopping of the transmission of the fourth optical signals.

In the above construction, the method may further contain a step of transmitting from the second optical terminal station to the first optical terminal station a fourth notice that the second optical terminal station has restarted transmission of the fourth optical signals, after the detection of the fourth abnormality in the eighth step.

In the above construction, the method may further contain a step of receiving by the first optical terminal station the third notice transmitted from the second optical terminal station; and a step of transmitting sixth optical signals from the first optical terminal station to the second optical terminal station after the reception of the third notice by the first optical terminal station until the fourth notice is received by the first optical terminal station.

In the above construction, in the seventh step, the detection of the fourth abnormality in the eighth step may be performed a third predetermined time after the transmission of the third notice in the sixth step, where the third predetermined time is determined to be larger than a time needed for the first optical terminal station to receive the third notice, and to perform an operation in response to the reception of the third notice after the third notice is transmitted from the second optical terminal station in the sixth step.

The above operation in response to the reception of the third notice may include an operation of masking the result of the detection of the third abnormality in the fifth step.

The above operation in response to the reception of the third notice may include an operation of halting the operation of the sixth step.

In addition to the above fifth to eighth steps, the method may further contain a step of transmitting from the second optical terminal station to the first optical terminal station alarm information indicating the fourth abnormality detected in the second optical terminal station, after the detection of the fourth abnormality in the eighth step.

According to the second aspect of the present invention, there is provided a system for detecting trouble occurring in a single-fiber two-way optical transmission system containing first and second optical terminal stations connected to each other through at least one two-way single optical fiber. Each of the first and second optical terminal stations contains: a first abnormality detecting unit for detecting a first abnormality in a first optical signal received at the above each optical terminal station; a first notice transmitting unit for transmitting from the above each optical terminal station to the other optical terminal station a first notice that the above each optical terminal station will stop transmission of second optical signals when the first abnormality is detected by the first abnormality detecting unit of the optical terminal station; a transmission stopping unit for stopping the transmission of the second optical signals after the transmission of the first notice by the first notice transmitting unit; and a second abnormality detecting unit for detecting a second abnormality in a third optical signal received at the above each optical terminal station after the stopping of the transmission of the second optical signals.

In the construction of the second aspect of the present invention, the above each optical terminal station may further contain a second notice transmitting unit for transmitting from the above each optical terminal station to the above other optical terminal station a second notice that the above each optical terminal station has restarted transmission of the second optical signals, after the detection of the second abnormality by the second abnormality detecting unit.

In the above construction, each optical terminal station may further contain a first notice receiving unit for receiving the first notice transmitted from the first notice transmitting unit in the other optical terminal station; and a transmission continuing unit for transmitting third optical signals from the above each optical terminal station to the above other optical terminal station after the reception of the first notice by the first notice receiving unit until the second notice transmitted from the second notice transmitting unit in the above other optical terminal station is received by the above each optical terminal station.

In the above construction, the stopping of the transmission by the transmission stopping unit may be performed a first predetermined time after the transmission of the first notice by the first notice transmitting unit, where the first predetermined time may be larger than a total time needed for the first notice transmitted from the above each optical terminal equipment to be received and recognized by the above other optical terminal equipment, and for the other optical terminal station to activate the transmission continuing unit in the above other optical terminal station.

In addition, the above other optical terminal station may further mask the alarm information from the alarm detecting unit, or halt operations in response to detection of abnormality in the above other optical terminal station.

In the construction of the second aspect of the present invention, the above each optical terminal station may further contain an alarm information transmitting unit for transmitting from the above each optical terminal station to the above other optical terminal station alarm information indicating the second abnormality detected in the above each optical terminal station, after the detection of the second abnormality by the second abnormality detecting unit.

In the construction of the second aspect of the present invention, in one of the optical terminal stations, the first notice transmitting unit may transmit the first notice a second predetermined time after the first abnormality is detected by the first abnormality detecting unit of the optical terminal station, the second predetermined time in the first notice transmitting unit of the optical terminal station is determined to be larger than an elapsed time after the first abnormality is detected in the first abnormality detecting unit of the other optical terminal station until the second abnormality detecting unit of the other optical terminal station detects the second abnormality of the above other optical terminal station.

According to the third aspect of the present invention, there is provided terminal equipment used in an optical terminal station in a single-fiber two-way optical transmission system which contains the optical terminal station, another optical terminal station, and at least one two-way single optical fiber connecting the terminal equipment with the other optical terminal station. The terminal equipment contains: a first abnormality detecting unit for detecting a first abnormality in a first optical signal received at the terminal equipment; a first notice transmitting unit for transmitting from the terminal equipment to the other optical terminal station a first notice that the optical terminal equipment will stop transmission of second optical signals when the first abnormality is detected by the first abnormality detecting unit; a transmission stopping unit for stopping the transmission of the second optical signals after the transmission of the first notice by the first notice transmitting unit; and a second abnormality detecting unit for detecting a second abnormality in a third optical signal received at the terminal equipment after the stopping of the transmission of the second optical signals.

In addition to the construction of the terminal equipment according to the third aspect of the present invention, the terminal equipment may further contain a second notice transmitting unit for transmitting from the terminal equipment to the other optical terminal station a second notice that the terminal equipment has restarted transmission of the second optical signals, after the detection of the second abnormality by the second abnormality detecting unit.

In addition to the above construction of the terminal equipment, the terminal equipment may further contain a first notice receiving unit for receiving the first notice transmitted from the other optical terminal station; and an transmission continuing unit for transmitting third optical signals from the terminal equipment to the other optical terminal station after the reception of the first notice by the first notice receiving unit until the second notice transmitted from the other optical terminal station is received by the terminal equipment.

In the above construction of the terminal equipment, the operation of the transmission stopping unit may be performed a first predetermined time after the transmission of the first notice by the first notice transmitting unit, where the first predetermined time may be larger than a total time needed for the first notice transmitted from the optical terminal equipment to be received and recognized by the other optical terminal station, and for the other optical terminal station to activate the transmission continuing unit in the above other optical terminal station.

In addition, the optical terminal equipment may further mask the alarm information from the alarm detecting unit, or halt operations in response to detection of abnormality by the alarm detecting unit.

In the construction of the terminal equipment according to the third aspect of the present invention, the terminal equipment may further contain an alarm information transmitting unit for transmitting from the terminal equipment to the other optical terminal station alarm information indicating the second abnormality detected in the terminal equipment, after the detection of the second abnormality by the second abnormality detecting unit.

In the construction of the terminal equipment according to the third aspect of the present invention, the first notice transmitting unit may transmit the first notice a fourth predetermined time after the first abnormality is detected by the first abnormality detecting unit of the optical terminal station, and the fourth predetermined time can be preset in advance before using of the terminal equipment in the single-fiber two-way optical transmission system.

DESCRIPTION OF THE PREFERRED EMBODIMENTS

Figure 1:
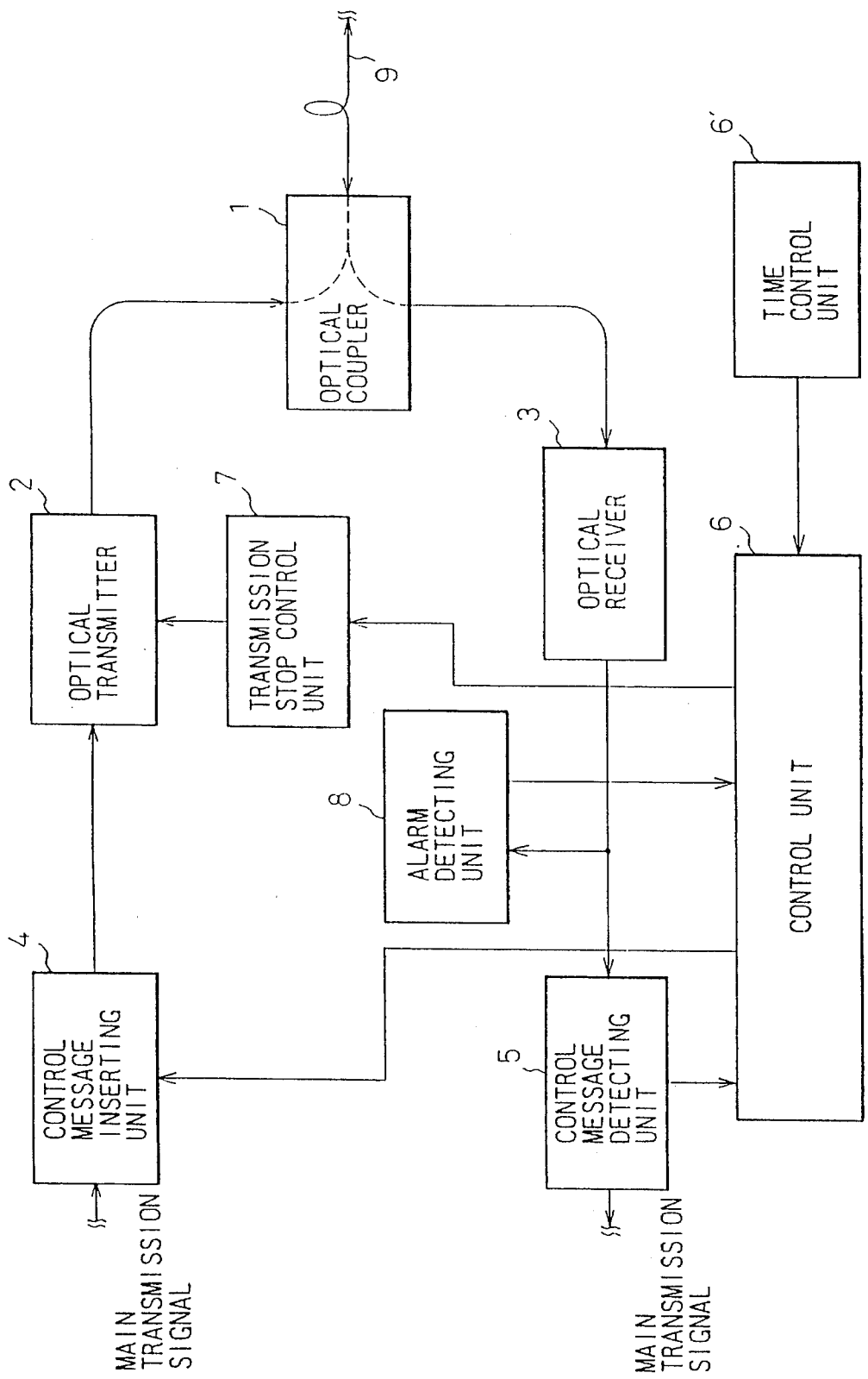
FIG. 1 is a diagram illustrating a construction of a piece of optical terminal equipment provided in an optical terminal station in an embodiment of the present invention.

Construction of Terminal Equipment (FIG. 1)

FIG. 1 is a diagram illustrating a construction of a piece of optical terminal equipment provided in an optical terminal station in an embodiment of the present invention. In FIG. 1, reference numeral 1 denotes an optical coupler, 2 denotes an optical transmitter, 3 denotes an optical receiver, 8 denotes an alarm detecting unit, 4 denotes a control message inserting unit, 7 denotes a transmission stop control unit, 5 denotes a control message detecting unit, 6 denotes a control unit, 6' denotes a time control unit, and 9 denotes a single-fiber two-way optical transmission line. The single-fiber two-way optical transmission line 9 connects the optical terminal station of FIG. 1 with an opposite optical terminal equipment having the same construction as FIG. 1.

In the normal operation of the construction of FIG. 1, an electrical signal is supplied through the control message inserting unit 4 to the optical transmitter 2, and is converted to an optical signal in the optical transmitter 2. The optical signal is transmitted from the optical transmitter 2 through the optical coupler 1 and the single-fiber two-way optical transmission line 9 to the opposite optical terminal equipment. In addition, another optical signal is transmitted from the opposite optical terminal equipment through the single-fiber two-way optical transmission line 9, and is then branched at the optical coupler 1 to the optical receiver 3. The above other optical signal is received at the optical receiver 3, and is converted to an electrical signal. The electrical signal is supplied to the next stage through the control message detecting unit 5. The control message detecting unit 5 monitors the information carried by the above electrical signal, and informs the control unit 6 of detection of one of predetermined notices (as explained later) contained in the information carried by the electrical signal when the notice is detected.

Although details are not shown, the alarm detecting unit 8 monitors the quality of the optical signal received by the optical receiver 3, to detect abnormalities such as an absence of the input of the optical signal (the level of the received optical signal being below a level required for converting the same to an electric signal), a failure in detection of frame synchronization (due to an error in a frame bit caused by a low level of the received optical signal), and a bit error in the received bit sequence. The bit error is detected by calculation using error check information transmitted with the data bit sequence. All of the above three types of abnormalities can be caused by a lowering of the level of the received optical signal. The detected result (as to whether or not the received optical signal is normal, and the type of the detected abnormality) is supplied to the control unit 6.

The transmission stop control unit 7 controls the optical transmitter 2 so that the optical transmitter 2 stops the transmission of the optical signal when the transmission stop control unit 7 is so controlled by the control unit 6, as explained later. The transmission stop control unit 7 may be realized by a laser diode control circuit which controls ON and OFF operations of a laser diode in the optical transmitter 2. The control unit 6 controls the overall operations of the terminal equipment of FIG. 1. The control unit 6 may control the overall operations of the optical terminal equipment containing the terminal equipment of FIG. 1. The time control unit 6' supplies time information to the control unit 6 for time control operations as explained later.

Figure 2:
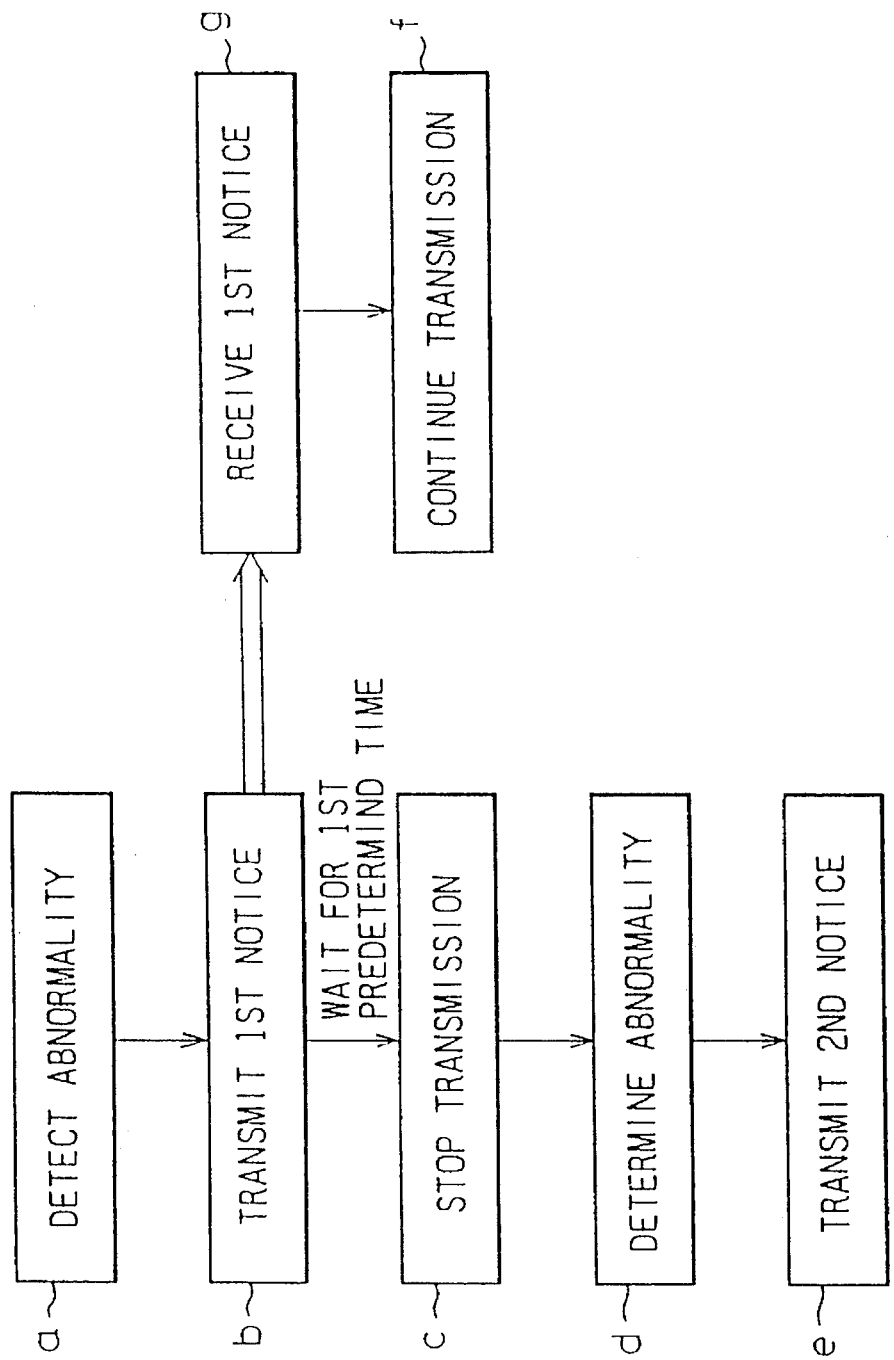
FIG. 2 is a diagram illustrating the basic operation according to the present invention.

Basic Operations (FIG. 2)

FIG. 2 is a diagram illustrating the basic operation according to the present invention. For clarity of explanation, the optical terminal equipment of FIG. 1 is designated as "optical terminal equipment A", and the opposite optical terminal equipment (terminal equipment provided in an opposite optical terminal station), is denoted as "opposite optical terminal equipment B". As described in the summary of the invention, when the alarm detecting unit 5 detects abnormality in the optical signal received by the optical receiver 3 (step a of FIG. 2), the detected abnormality is informed to the control unit 6. In response to the information, the control unit 6 supplies to the control message inserting unit 4 a first notice that "the optical terminal equipment A will stop transmission of optical signals". The control message inserting unit 4 inserts the first notice into information carried by the electrical signal to be supplied to the optical transmitter 2. Thus, the first notice is transmitted to the opposite optical terminal equipment B from the optical transmitter 2, through the optical coupler 1 and the single-fiber two-way optical transmission line 9 (step b of FIG. 2). The optical signal containing the first notice is received by the opposite optical terminal equipment B (which is not shown, but has the same construction as the optical terminal equipment A of FIG. 1), and the first notice is detected by the control message detecting unit 5 in the opposite optical terminal equipment B (step g of FIG. 2), and the detection of the first notice is informed to the control unit 6 in the opposite optical terminal equipment B. In response to the information, the control unit 6 in the opposite optical terminal equipment B halts (does not start) operations (step f) as the optical terminal equipment A has done in the above steps a and b (or masks alarm information detected by the alarm detecting unit 8 in the opposite optical terminal equipment B) until the opposite optical terminal equipment B receives another (second) notice that the optical terminal equipment A has restarted the transmission of optical signals, even when an abnormality is detected in the optical terminal equipment B. Namely, the optical terminal equipment B continues to transmit optical signals to the optical terminal equipment A as usual until the opposite optical terminal equipment B receives another (second) notice that the optical terminal equipment A has restarted the transmission of optical signals, even when the alarm detecting unit in the opposite optical terminal equipment B detects an abnormality in the optical signal received by the opposite optical terminal equipment B. Then, the control unit 6 in the optical terminal equipment A controls the transmission stop control unit 7 so that the optical transmitter 2 in the optical terminal equipment of FIG. 1 stops the transmission of optical signals (step d). Thus, no optical signal is transmitted from the optical transmitter 2 in the optical terminal equipment A, and reflected by any break point in the optical transmission line or leaked in the optical coupler 1. Thus, optical signals received at the optical receiver 3 in the optical terminal equipment A contains no component caused by a reflected or leaked optical signal which is transmitted from the optical transmitter 2 in the optical terminal equipment A and reflected by any break point of the optical transmission line or leaked in the optical coupler 1.

In the above condition, the control unit 6 in the optical terminal equipment A obtains the monitor result of the alarm detecting unit 8 which is not affected by the optical signal transmitted from the optical transmitter 2 in the optical terminal equipment A, and reflected by any break point of the optical transmission line or leaked in the optical coupler 1 (step d). Thus, the control unit 6 in the optical terminal equipment A can determine whether or not the optical signal transmitted from the opposite optical terminal equipment B through the single-fiber two-way optical transmission line 9 is normally received by the optical terminal equipment A, and what type of abnormality occurs in the optical signal transmitted from the opposite optical terminal equipment B through the single-fiber two-way optical transmission line 9 to the optical terminal equipment A, without disturbance caused by a reflected or leaked optical signal. When the above determination of the abnormality in the optical signal transmitted from the opposite optical terminal equipment B through the single-fiber two-way optical transmission line 9, is completed, the control unit 6 in the optical terminal equipment A supplies the second notice that "the optical terminal equipment A has restarted transmission of the second optical signals" to the control message inserting unit 4 in the optical terminal equipment A to transmit the second notice to the opposite optical terminal equipment B (step e). The second notice is detected by the control message detecting unit 5 in the opposite optical terminal equipment B, and is informed to the control unit 6 in the opposite optical terminal equipment B. In response to the second notice, the control unit 6 in the opposite optical terminal equipment B can start the operations (of the above steps a and b) as halted above (or quit the masking of the alarm information detected by the alarm detecting unit). Thus, when the alarm detecting unit 8 in the optical terminal equipment B detects abnormality in the optical signal received by the optical receiver 3 in the optical terminal equipment B, the optical terminal equipment B performs the operations as the optical terminal equipment A does in the above steps a, b, c, and d, and the optical terminal equipment A performs the operations as the optical terminal equipment B does in the steps f and g.

In the above operation, the above stopping of transmission in the optical terminal equipment A should be made after a first predetermined time has elapsed from the time the above notice is transmitted from the optical terminal equipment A, where the first predetermined time is determined to be larger than a total of a time needed for the first notice transmitted from the optical terminal equipment A to be received and recognized by the optical terminal equipment B, and a time needed for the opposite optical terminal equipment to halt the above operations of the steps a and b (or to mask the alarm information from the alarm detecting unit 8) after the above notice is transmitted from the optical terminal equipment A. Alternatively, in order to effect the above time order of the operations, any operation prior to the determination of the abnormality in the optical terminal equipment A, such as the operation of stopping the transmission of optical signals from the optical terminal equipment A, may be delayed for the above first predetermined time. The above time control can be carried out by using the time control unit 6' which contains a timer.

In the above operation, alarm information indicating the abnormality determined by the control unit 6 may be transmitted to the opposite optical terminal equipment B, through the same route as the above notices.

After the above operations by the optical terminal equipment A, operations similar to the operations performed by the optical terminal equipment A, may further be performed by the opposite optical terminal equipment B. In this case, the operation of transmitting from the opposite optical terminal equipment B to the optical terminal equipment B a notice that "the optical terminal equipment B will stop transmission of optical signals", a second predetermined time after abnormality is first detected in the optical terminal equipment B, where the second predetermined time is determined to be larger than an elapsed time after the abnormality is first detected in the optical terminal equipment A until the optical terminal equipment A determines the abnormality after the stopping of the transmission of optical signals. Thus, when trouble occurs, only one (the optical terminal equipment A) of the two opposite pieces of optical terminal equipment can first perform the operations for determining the abnormality, and then the other (the opposite optical terminal equipment B) can perform a similar operation for determining the abnormality after the operation of transmitting optical signals from the optical terminal equipment A is restarted. The above time control of the second predetermined time is also performed by using the time control unit 6'.

Figure 3:
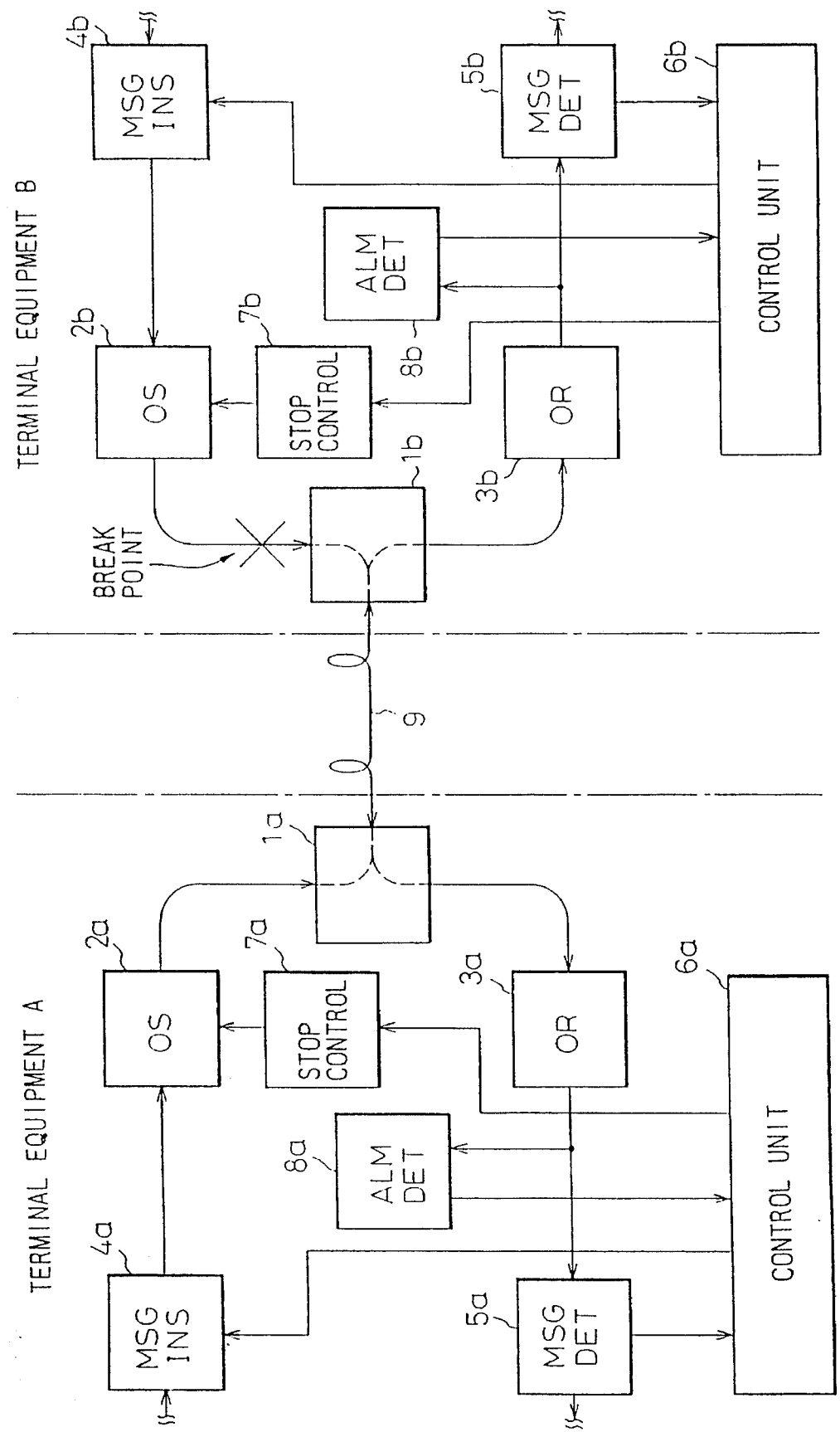
FIG. 3 is an diagram illustrating the overall construction of the transmission system and the location of a break in case I.

Details of Operations—Case I—(FIG. 3)

FIG. 3 is an diagram illustrating the overall construction of the transmission system and the location of a break in the case I.

The transmission systems in FIGS. 3 to 6 contain two opposite pieces (A and B) of optical terminal equipment and a single-fiber two-way optical transmission line 9. Each of the two pieces (A and B) of optical terminal equipment in each of FIGS. 3 to 6, has the same construction as FIG. 1 except that "a" is affixed to the respective references for the elements of the terminal equipment A, and "b" is affixed to the respective references for the elements of the terminal equipment B. In the constructions of FIGS. 3 to 6, the time control unit 6' in FIG. 1 is contained in the control unit 6a or 6b, and the time values each of which will be referred to as "predetermined time" in the following explanations, are assumed to be written in advance by as program, or manually preset by a manual switch or any man-machine interface.

Further, in the following explanations, it is assumed that both the opposite pieces A and B of terminal equipment normally continuously transmit optical signals to each other through the single-fiber two-way optical transmission line 9 with the same wavelength.

In the case I, it is assumed that an optical signal path from an optical transmitter to an optical coupler in the optical terminal station B is broken, and no optical signal transmitted from the optical terminal station A is returned to the optical receiver 3a in the optical terminal equipment A due to leakage in the optical couplers 1a and 1b in both the pieces of optical terminal equipment. The system for detecting trouble in a single-fiber two-way optical transmission according to the present invention operates as follows.

STEP I: In the above situation, transmission of optical signals from the optical terminal equipment B to the optical terminal equipment A is completely stopped due to the break of the above optical signal path.

STEP II: Therefore, the alarm detecting unit 8a in the optical terminal equipment A detects the absence of the input of the optical signal, and informs the the control unit 6a in the optical terminal equipment A of detection of the failure.

STEP III: In response to the information on the detection of the absence of the input of the optical signal, the control unit 6a supplies a first control message that "(the optical transmitter 2a in) the terminal equipment A will stop the transmission of optical signals" to the control message inserting unit 4a, and controls the control message inserting unit 4a so that the first control message is inserted in information carried by transmission signals (electric signals). The transmission signals containing the first control message is converted to optical signals in the optical transmitter 2a, and the optical signals are transmitted therefrom through the single-fiber two-way optical transmission line 9 to the opposite terminal equipment B.

STEP IV: Then, the optical signals are received by the optical receiver 3b in the optical terminal equipment B, and the control message detecting unit 5b in the optical terminal equipment B detects the first control message carried by the transmission signals. The detected first control message is transferred to the control unit 6b. Receiving the first control message notifying "the stop of transmission from the optical terminal equipment A", the control unit 6b in the optical terminal equipment B halts operations in response to possible detection of abnormality by the alarm detecting unit 8b in the terminal equipment B (or masks alarm information supplied from the alarm detecting unit 8b), until the optical terminal equipment B receives another (second) control message from the optical terminal equipment A, which notifies that "the transmission of optical signals from the optical terminal equipment A is restarted". The optical transmitter 26 in the optical terminal equipment B continues to transmit optical signals onto the signal path containing the break point.

STEP V: After a first predetermined time elapsed from when the above first control message is transmitted from the optical terminal equipment A, the control unit 6a in the optical terminal equipment A stops the transmission of optical signals from the optical terminal equipment A. The above first predetermined time is determined in the same manner as explained before.

STEP VI: Since optical signals are not transmitted from the optical terminal equipment A, no optical signal which is transmitted from the optical terminal equipment A and which might be reflected at a break point or leaked through the optical coupler, affects the alarm detection in the alarm detecting unit 8a in the optical terminal equipment A. Thus, the alarm detecting unit 8a in the optical terminal equipment A can detect the abnormality in a received optical signal accurately. The control unit 6a recognizes and memorizes the detected abnormality, which in this case would again be the absence of the input.

STEP VII: After the abnormality is determined in the optical terminal equipment A, the control unit 6a controls the transmission stop control unit so that the optical transmitter 2a restarts the transmission of optical signals, and the control unit 6a controls the control message inserting unit 4a to insert the second control message that "transmission is restarted", into the transmission signals. The second control message may further indicate the "detection of abnormality" or the "type of detected abnormality".

STEP VIII: After the above operations, the alarm detecting unit 8a in the optical terminal equipment A monitors the quality of the received optical signals, and the type of the abnormality detected by the alarm detecting unit 8a is supplied to the control unit 6a. When the detected condition of the received optical signal is different from the type of the abnormality memorized in the above step VI by the control unit 8a, the above sequence of steps II to VI is repeated to determine whether or not the received optical signal is restored to a normal condition, or whether or not the type of abnormality has changed. When the restoration to the normal condition is determined, the control unit 6a clears the information on the abnormality memorized in step V, and the optical terminal equipment A returns to the normal state.

Figure 4:
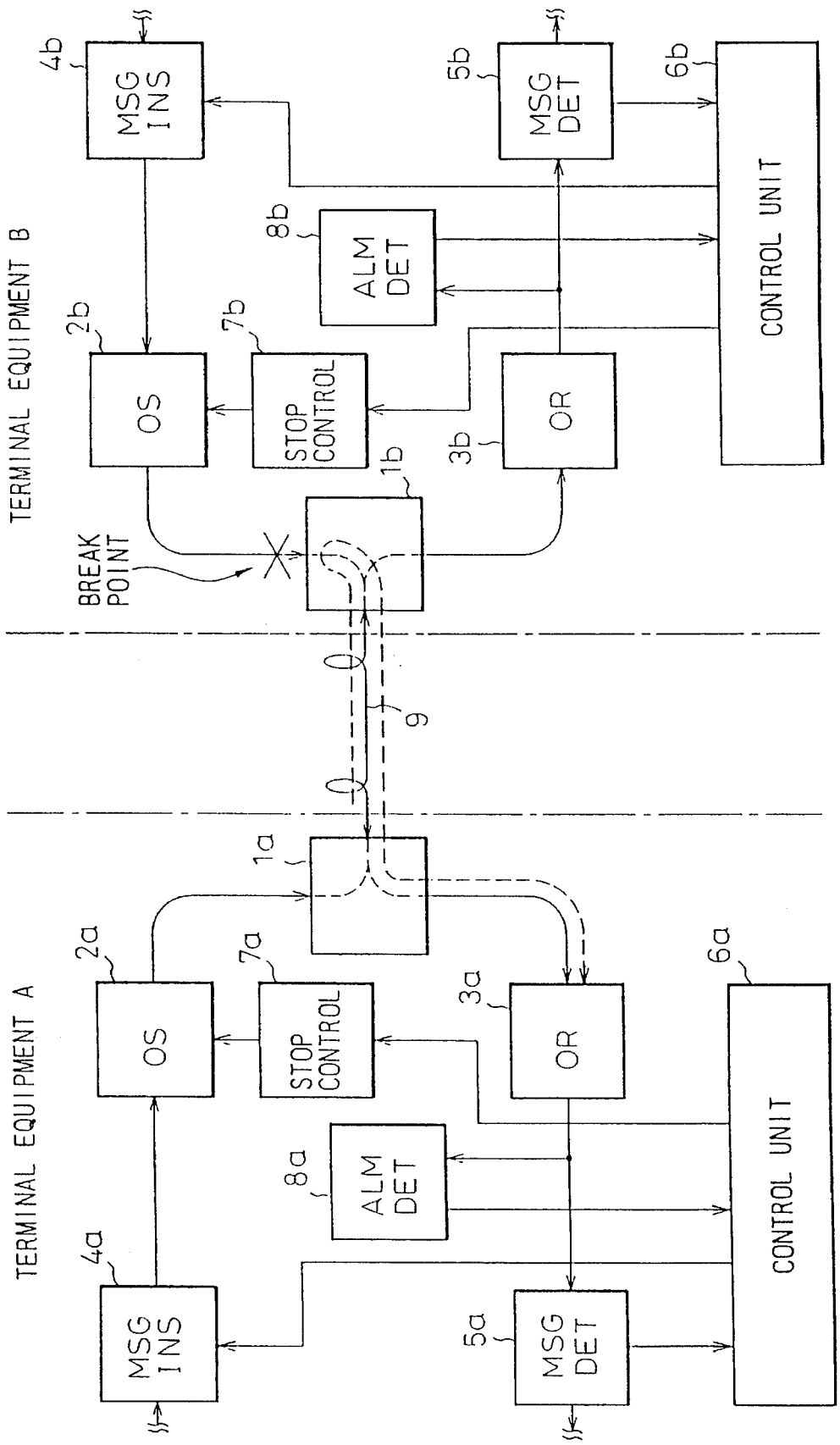
FIG. 4 is a diagram illustrating the overall construction of the transmission system and the location of a break in case II.

Details of Operations—Case II—(FIG. 4)

FIG. 4 is a diagram illustrating the overall construction of the transmission system and the case II. In the case II, the optical signal path from the optical transmitter to the optical coupler in the optical terminal station B is broken, and there is substantial reflection of the optical signal transmitted from the optical terminal station A, due to leakage in the optical coupler 1b in the optical terminal equipment B. In addition, it is assumed that the amount of the optical signal leaked through the optical coupler 1b in the optical terminal equipment B toward the optical transmitter 2b in the optical terminal equipment B, reflected at the break point in the optical signal path from the optical transmitter to the optical coupler in the optical terminal station B, and received by the optical receiver 3a in the optical terminal equipment A, is such that the level of the leaked and reflected optical signal received by the optical receiver 3a cannot cause the alarm detecting unit 8a to detect the "absence of the input", but may cause the alarm detecting unit 8a to detect the "failure in detection of the frame synchronization (out of frame synchronization)". At the optical terminal equipment, it is difficult to determine whether the "failure in detection of the frame synchronization" is caused by the above leaked and reflected optical signal, by any trouble which may occur in the optical transmitter 2b in the opposite optical terminal equipment B, or by trouble in the single-fiber two-way optical transmission line.

The same operations as the above steps II to VIII can be applied to the case shown in FIG. 4, except that the type of abnormality detected by the alarm detecting unit 8a, and supplied to the control unit 6a in step I is the "failure in detection of the frame synchronization" instead of the "absence of the input". The type of abnormality detected by the alarm detecting unit 8a, and supplied to and memorized by the control unit 6a in step VI is also the "absence of input" in this case.

In the case wherein the distance between the two opposite pieces (A and B) of optical terminal equipment are apart from each other by a large distance, it takes a long time for the optical signal reflected at the break point to reach the optical terminal equipment A. In this case, the optical terminal equipment A may be required to wait further for the end of the leaked and reflected optical signal to reach the optical terminal equipment A after the transmission of the optical signals is stopped in step II.

Figure 5:
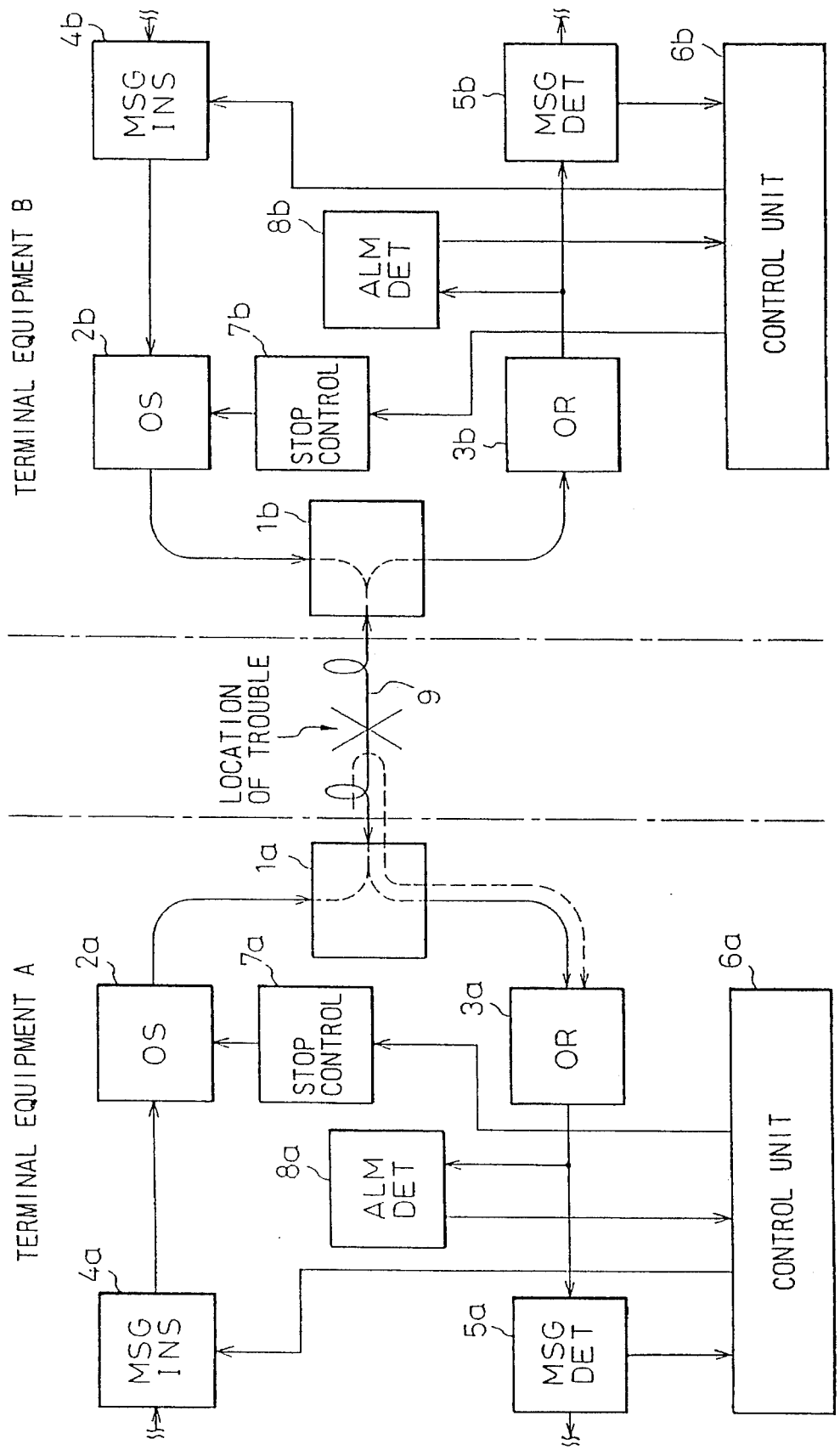
FIG. 5 is a diagram illustrating the overall construction of the transmission system and the location of a break point in case III wherein a single-fiber two-way optical transmission line between the optical terminal stations A and B is broken.

Details of Operations—CaseIII—(FIG. 5)

FIG. 5 is a diagram illustrating the overall construction of the transmission system and the location of a break point in the case III wherein a single-fiber two-way optical transmission line between the optical terminal stations A and B is broken. In the case III, optical signals transmitted from the optical terminal equipment A are reflected at the break point, and the optical signals transmitted from the optical terminal equipment B are not reflected at the break point.

The above situation may arise due to the conditions of cut surfaces of the optical fiber at the broken cross-section.

In the case III, both of the opposite pieces (A and B) of optical terminal equipment detect abnormalities. Namely, the alarm detecting unit 8a in the optical terminal equipment A may detect the "failure in detection of frame synchronization", and the alarm detecting unit 8b in the optical terminal equipment B will detect the "absence of input". Then, both of the opposite pieces A and B of optical terminal equipment start the above operations of steps II to VIII. Finally, both of the opposite pieces (A and B) of optical terminal equipment will recognize the type of abnormality as "absence of input" in step VI.

Figure 6:
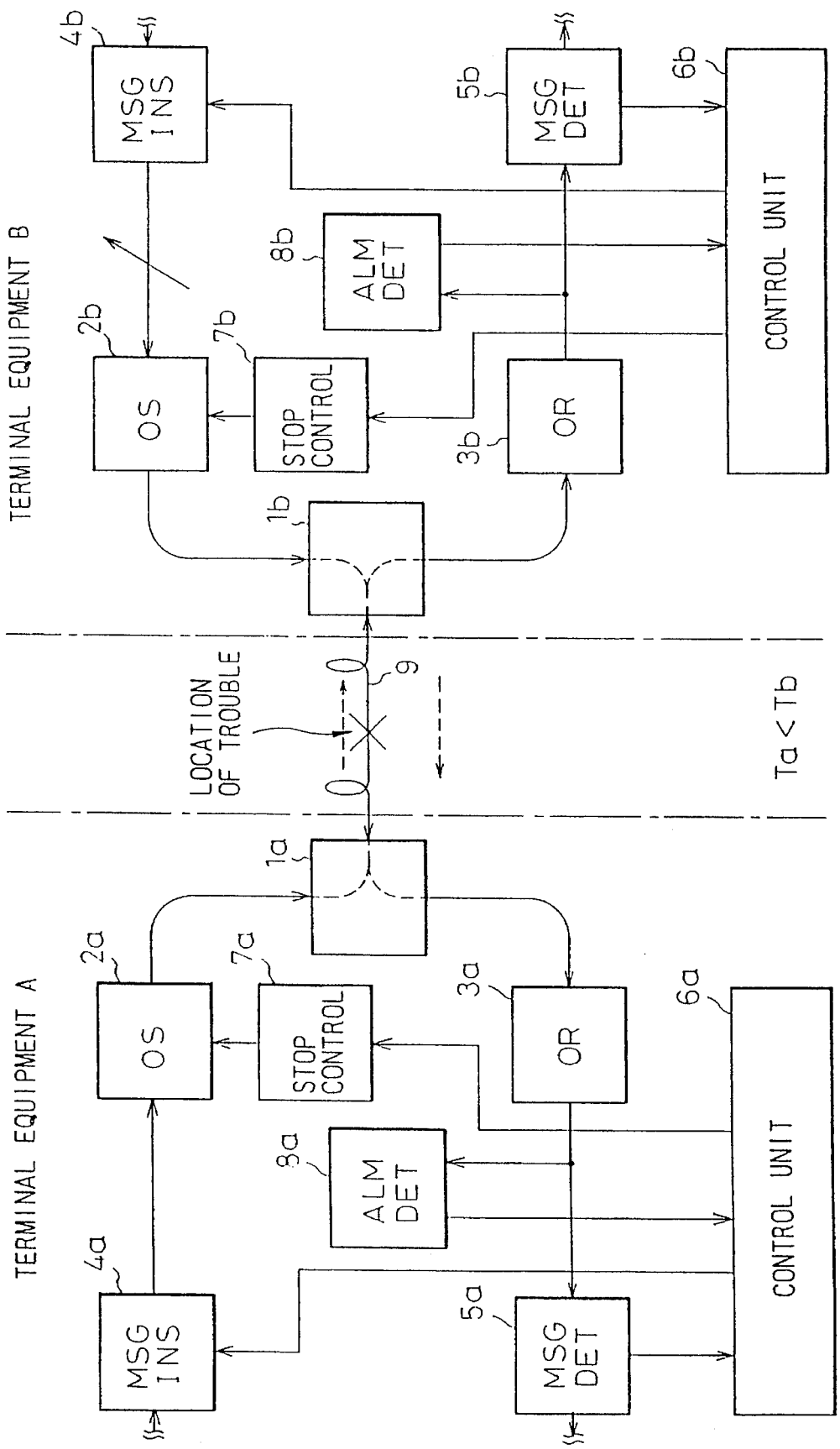
FIG. 6 is an explanatory diagram of case IV wherein the same situation as the case shown in FIG. 5 is handled in another manner.

Details of Operations—Case IV—(FIG. 6)

FIG. 6 is an explanatory diagram of the case wherein the same situation as the case shown in FIG. 5 is handled in another manner.

According to the process explained above with reference to FIG. 5, both of the pieces A and B of optical terminal equipment substantially simultaneously detect first abnormality of the received optical signals, and stops the transmission in both directions. Then, each optical terminal equipment finally detects the "absence of input", although the absence of input may be caused by the simultaneous stopping of the transmission from the opposite optical terminal equipment. Therefore, according to the process explained above with reference to FIG. 5, the type of trouble may not be able to be detected accurately. The process explained with reference to FIG. 6 is provided for solving such a problem.

According to the process explained here, one of the two opposite pieces of optical terminal equipment, for example, the optical terminal equipment B transmits therefrom to the optical terminal equipment A the first control message notifying that "the optical terminal equipment B will stop transmission of optical signals", a second predetermined time after the optical terminal equipment B first detects an abnormality of the optical signal received by the optical terminal equipment B, where the second predetermined time is determined to be larger than an elapsed time after the optical terminal equipment A first detects an abnormality of the optical signal received by the optical terminal equipment A until the optical terminal equipment A finally recognizes the type of the abnormality. Then, when the above first predetermined time has elapsed after the above first control message is transmitted, the optical terminal equipment B stops the transmission of optical signals therefrom, and determines the type of the abnormality.

Alternatively, each optical terminal equipment may wait for a third predetermined time $T_i$ (i=A or B) after the first detection of the abnormality of the received optical signal until the transmission of the first control message notifying the stop of transmission. The third predetermined time $T_i$ (i=A or B) may be determined so that the difference $T_B - T_A$ is larger than the above time elapsed after the optical terminal equipment A first detects an abnormality of the optical signal received by the optical terminal equipment A until the optical terminal equipment A finally recognizes the type of the abnormality.

The above process is explained below with reference to FIG. 6 for an example case wherein trouble in the optical fiber cable (for example, a defective connection of the optical fiber cable) causes a substantial loss in the optical signals passing through the point of the trouble.

STEP i: Due to the above loss in the optical signals received by the respective pieces of optical terminal equipment, both the pieces A and B of optical terminal equipment detect the "failure in detection of frame synchronization".

STEP ii: Then, the control unit 6a or 6b in each optical terminal equipment prepares to transmit the first control message notifying the stop of transmission, and waits for the above third predetermined time $T_i$ (i=A or B) by using the time control unit (not shown) included in the control unit 6a or 6b.

STEP iii: In the case of $T_B > T_A$ as explained above, first, the optical terminal equipment A transmits the first control message that "the optical terminal equipment A will stop transmission of the optical signal" to the opposite optical terminal equipment B.

STEP iv: When the optical terminal equipment B receives the above control message from the optical terminal equipment A, the control unit 6b in the optical terminal equipment B masks the alarm information from the alarm detecting unit 8b. The masking of the alarm information by the control unit 6b continues until the above third predetermined time $T_B$ elapses or until the optical terminal equipment B receives the second control message (notice) from the optical terminal equipment A, that "the optical terminal equipment A has restarted the transmission of optical signals".

STEP v: The optical terminal equipment A stops the transmission of optical signals when the above first predetermined time elapses after the above first control message is transmitted. Thus, the optical terminal equipment A does not receive an optical signal other than that transmitted from the opposite optical terminal equipment B.

STEP vi: Thus, the optical terminal equipment A determines and memorizes the type of the abnormality without disturbance by the reflected and/or leaked optical signals.

STEP vii: Then, the optical terminal equipment A restarts the transmission of optical signals, and transmits the second control message notifying the "restart of the transmission" to the opposite optical terminal equipment B.

STEP viii: When the above third predetermined time $T_B$ elapses, the optical terminal equipment B transmits the first control message notifying the "stop of the transmission" to the opposite optical terminal equipment A. At this time, the masking of the alarm information in the optical terminal equipment B is stopped as mentioned above.

STEP ix: When the optical terminal equipment A receives the above first control message, the control unit 6a in the optical terminal equipment A masks the alarm information from the alarm detecting unit 8a. The masking of the alarm information in the optical terminal equipment A continues until the optical terminal equipment A receives the second control message from the opposite optical terminal equipment B.

STEP x: The optical terminal equipment B stops the transmission of optical signals when the above first predetermined time elapses after the above first control message is transmitted. Thus, the optical terminal equipment B does not receive an optical signal other than that transmitted from the opposite optical terminal equipment A.

STEP xi: Thus, the optical terminal equipment B determines and memorizes the type of the abnormality without disturbance by the reflected and/or leaked optical signals.

STEP xii: Then, the optical terminal equipment B restarts the transmission of optical signals, and transmits the second control message notifying the "restart of the transmission" to the opposite optical terminal equipment A. Thus, the above masking of the alarm information in the optical terminal equipment A is stopped.

After the above operations, as described in step VII for the case I, the alarm detecting unit in each optical terminal equipment monitors the quality of the received optical signals. When the detected condition of the received optical signal is different from the type of the abnormality determined in the above step vi or xi, the above sequence of operations is repeated to determine whether or not the received optical signal is restored to a normal condition, or whether or not the type of abnormality has changed. When the restoration to the normal condition is determined, the control unit in each optical terminal equipment clears the information on the abnormality memorized in step vi or xi, and each optical terminal equipment returns to the normal state.

Further, the above process can be applied to other types of troubles such as a case wherein an optical fiber cable is cut at a point, optical signals propagated from one direction to the cut point are reflected toward the opposite direction, and the other optical signals propagated from the opposite direction to the cut point are not reflected.

Other Variations

In the constructions explained above, the type of abnormality determined and memorized by the control unit 6a or 6b may be transmitted to the opposite optical terminal equipment as alarm information, and a control message containing this alarm information may be replaced with the above-mentioned second notice notifying the "restart of transmission". Namely, when the opposite optical terminal equipment receives such a control message, the optical terminal equipment can recognize that the transmission is restarted from the other optical terminal equipment.

I claim:

1. A method for detecting trouble occurring in a single-fiber two-way optical transmission system containing first and second optical terminal stations connected to each other through at least one two-way single optical fiber, comprising the steps of:

(a) detecting a first abnormality in a first optical signal received at the first optical terminal station;

(b) transmitting from the first optical terminal station to the second optical terminal station a first notice that the first optical terminal station will stop transmission of second optical signals when the first abnormality is detected in step (a);

(c) stopping transmission of the second optical signals from the first optical terminal station, after the transmission of the first notice in step (b); and (d) detecting a second abnormality in a third optical signal received at the first optical terminal station after the stopping of the transmission of the second optical signals.

2. A method according to claim 1, further comprising the step of, (e) transmitting from the first optical terminal station to the second optical terminal station a second notice that the first optical terminal station has restarted transmission of second optical signals, after the detection of the second abnormality in step (d).

3. A method according to claim 2, further comprising the steps of, (f) receiving by the second optical terminal station the first notice transmitted from the first optical terminal station; and (g) transmitting third optical signals from the second optical terminal station to the first optical terminal station after the reception of the first notice by the second optical terminal station at least until the second notice is received by the second optical terminal station.

4. A method according to claim 3, wherein, in step (c), the operation of stopping the transmission from the first optical station is performed a first predetermined time after the transmission of the first notice in step (b), where the first predetermined time is determined to be larger than a time needed for the second optical terminal station to receive the first notice, and to perform an operation in response to the reception of the first notice after the first notice is transmitted from the first optical terminal station in step (b).

5. A method according to claim 1, further comprising the step of,
   (h) transmitting from the first optical terminal station to the second optical terminal station alarm information indicating detection of the second abnormality detected in the first optical terminal station, after the detection of the second abnormality in step (d).

6. A method according to claim 1, further comprising the steps of:
   (i) detecting a third abnormality in a fourth optical signal received at the second optical terminal station;
   (j) transmitting from the second optical terminal station to the first optical terminal station a third notice that the second optical terminal station will stop transmission of fifth optical signals, a second predetermined time after the third abnormality is detected in step (i), where the second predetermined time is determined to be larger than an elapsed time after the first abnormality is detected in step (a) until the first optical terminal station detects the second abnormality in step (d);
   (k) stopping the transmission of the fifth optical signals after the transmission of the third notice in step (j); and
   (l) detecting a fourth abnormality in a sixth optical signal received at the second optical terminal station after the stopping of the transmission of the fifth optical signals.

7. A method according to claim 6, further comprising the step of,
   (m) transmitting from the second optical terminal station to the first optical terminal station a fourth notice that the second optical terminal station has restarted transmission of the fifth optical signals, after the detection of the fourth abnormality in step (l).

8. A method according to claim 7, further comprising the step of,
   (n) receiving by the first optical terminal station the third notice transmitted from the second optical terminal station; and
   (o) transmitting seventh optical signals from the first optical terminal station to the second optical terminal station after the reception of the third notice by the first optical terminal station until the fourth notice is received by the first optical terminal station.

9. A method according to claim 8, wherein, in step (k), the detection of the fourth abnormality in step (l) is performed a third predetermined time after the transmission of the third notice in step (j), the third predetermined time is determined to be larger than a time needed for the first optical terminal station to receive the third notice, and to perform an operation in response to the reception of the third notice after the third notice is transmitted from the second optical terminal station in step (j).

10. A method according to claim 9, wherein said operation in response to the reception of the third notice may include an operation of masking the result of the detection of the third abnormality in step (i).

11. A method according to claim 9, wherein said operation in response to the reception of the third notice may include an operation of halting the operation of step (j).

12. A method according to claim 6, further comprising the step of,
   (p) transmitting from the second optical terminal station to the first optical terminal station alarm information indicating the fourth abnormality detected in the second optical terminal station, after the detection of the fourth abnormality in step (l).

13. A system for detecting trouble occurring in a single-fiber two-way optical transmission system containing first and second optical terminal stations connected to each other through at least one two-way single optical fiber, each of the first and second optical terminal stations comprising:
   abnormality detecting means for detecting a first abnormality in a first optical signal received at said each optical terminal station;
   notice transmitting means for transmitting from each said optical terminal station to the other optical terminal station a first notice that each said optical terminal station will stop transmission of second optical signals when the first abnormality is detected by the abnormality detecting means of the optical terminal station;
   transmission stopping means for stopping the transmission of second optical signals after transmission of the first notice by the notice transmitting means;
   said abnormality detecting means being able to detect a second abnormality in a third optical signal received at said each optical terminal station after the stopping of the transmission of the second optical signals.

14. A system according to claim 13, wherein
   said notice transmitting means for transmitting from each said optical terminal station to said other optical terminal station transmits a second notice that each said optical terminal station has restarted transmission of second optical signals, after detection of the second abnormality by the abnormality detecting means.

15. A system according to claim 14, wherein each said optical terminal station further comprises,
   notice receiving means for receiving the first notice transmitted from the notice transmitting means in said other optical terminal station; and
   transmission continuing means for transmitting third optical signals from each said optical terminal station to said other optical terminal station after the reception of the first notice by the notice receiving means until the second notice transmitted from the notice transmitting means in said other optical terminal station is received by each said optical terminal station.

16. A system according to claim 15, wherein, the operation of the transmission stopping means is performed a first predetermined time after the transmission of the first notice by the notice transmitting means, the first predetermined time is determined to be larger than a total time needed for the first notice transmitted from each said optical terminal equipment to be received and recognized by said other optical terminal equipment, and for said other optical terminal station to perform an operation in response to the reception of the first notice.

17. A system according to claim 16, wherein said operation in response to the reception of the first notice includes an operation of masking the result of the detection of the third abnormality by the abnormality detecting means.

18. A system according to claim 16, wherein said operation in response to the reception of the first notice includes an operation of halting the operation of the first notice transmitting means.

19. A system according to claim 13, wherein said each optical terminal station further comprises, alarm information transmitting means for transmitting from each said optical terminal station to said other optical terminal station alarm information indicating the second abnormality detected in said each optical terminal station, after the detection of the second abnormality by the abnormality detecting means of said each optical terminal station.

20. A system according to claim 13, wherein, in one of the optical terminal stations, the notice transmitting means transmits the first notice a second predetermined time after the first abnormality is detected by the abnormality detecting means of said one of the optical terminal stations, the second predetermined time in the notice transmitting means of said one of the optical terminal stations is determined to be larger than an elapsed time after the first abnormality is detected in the abnormality detecting means of the other one of the optical terminal stations until the abnormality detecting means of said other one of the optical terminal stations detects the second abnormality of said other one of the optical terminal stations.

21. Terminal equipment used in an optical terminal station in a single-fiber two-way optical transmission system which contains the optical terminal station, another optical terminal station, and at least one two-way single optical fiber connecting the terminal equipment with said other optical terminal station, comprising:

abnormality detecting means for detecting a first abnormality in a first optical signal received at said terminal equipment;

first notice transmitting means for transmitting from said terminal equipment to said other optical terminal station a first notice that said optical terminal station will stop transmission of second optical signals when the first abnormality is detected by the abnormality detecting means;

transmission stopping means for stopping the transmission of the second optical signals after the transmission of the first notice by the first notice transmitting means;

said abnormality detecting means being able to detect a second abnormality in a third optical signal received at said terminal equipment after the stopping of the transmission of the second optical signals.

22. Terminal equipment according to claim 21, further comprising second notice transmitting means for transmitting from said terminal equipment to said other optical terminal station a second notice that said terminal equipment has restarted transmission of the second optical signals, after the detection of the second abnormality by the second abnormality detecting means.

23. Terminal equipment according to claim 22, further comprising, first notice receiving means for receiving the first notice transmitted from said other optical terminal station; and transmission continuing means for transmitting third optical signals from said terminal equipment to said other optical terminal station after the reception of the first notice by the first notice receiving means until the second notice transmitted from said other optical terminal station is received by said terminal equipment.

24. Terminal equipment according to claim 23, wherein the operation of the transmission stopping means is performed a first predetermined time after the transmission of the first notice by the first notice transmitting means, the first predetermined time is determined to be larger than a total time needed for the first notice transmitted from said optical terminal equipment to be received and recognized by said other optical terminal station, and for said other optical terminal station to perform an operation in response to the reception of the first notice.

25. Terminal equipment according to claim 24, wherein said operation in response to the reception of the first notice includes an operation of masking the result of the detection of the first abnormality by the abnormality detecting means.

26. Terminal equipment according to claim 24, wherein said operation in response to the reception of the first notice includes an operation of halting the operation of the first notice transmitting means.

27. Terminal equipment according to claim 21, further comprising, alarm information transmitting means for transmitting from said terminal equipment to said other optical terminal station alarm information indicating the second abnormality detected in said terminal equipment, after the detection of the second abnormality by the abnormality detecting means.

28. Terminal equipment according to claim 21, wherein the first notice transmitting means transmits the first notice a first predetermined time after the first abnormality is detected by the abnormality detecting means of the optical terminal station, and the first predetermined time can be preset in advance before using of terminal equipment in the single-fiber two-way optical transmission system.

* * * * *